UNITED STATES PATENT OFFICE

HENRY BACON, OF CHARLESTON, MAINE.

IMPROVEMENT IN MANUFACTURE OF ARTIFICIAL STONE.

Specification forming part of Letters Patent No. 213,087, dated March 11, 1879; application filed February 1, 1879.

*To all whom it may concern:*

Be it known that I, HENRY BACON, of Charleston, in the county of Penobscot and State of Maine, have invented an Improvement in the Manufacture of Artificial Stone; and I hereby declare the following to be a full, clear, and exact description thereof.

My present invention consists in a compound for artificial stone, formed of sand and cement, united and solidified by dampening with a crystallizing solution formed of certain chemical ingredients to be hereinafter described, a hard, durable, and economical building material being thus produced, which is impervious to air and water and will withstand the action of frost, thereby adapting it for use in any climate.

To enable others skilled in the art to understand and use my invention, I will proceed to describe the manner in which I have carried it out.

I place one hundred gallons of water in a suitable vessel, and add thereto five pounds of starch, (preferably rice-starch,) three pounds of soap-bark boiled to suds, two pounds of plumbago mixed with linseed-oil, two pounds of baryta or sulphate of barium, one pint of solution of tin, one pint of solution of copper, two pounds of zinc-white or one quart of solution of zinc, one-half pound of asbestus, and one pint of a compound formed of equal parts of oxide of lead (litharge) and glycerine, mixed till it becomes a paste, and thoroughly and intimately incorporate or combine the whole together by stirring. I then thoroughly mix, while dry, one part (more or less) of cement and ten parts (more or less) of clean sharp sand or gravel, and dampen this mixture of cement and sand with a sufficient quantity of the above-described liquid compound, composed of the several ingredients specified, and then tamp it in the ordinary manner.

The stone, after being made as described, should be continuously dampened with cold water for about four days.

The dampening of the sand and cement with the above-described chemical solution causes the particles to adhere firmly together, and produces a perfect crystallization of the compound, which is thus solidified and rendered extremely hard and durable, and when dry it is impervious to air and water, which prevents the entrance of moisture and the consequent injury or destruction of the stone by frost when exposed to low temperatures.

An infinite variety of articles—such as blocks and ornaments used for buildings, vases, &c.—may be easily and cheaply manufactured of the artificial stone above described by the employment of suitable molds; and it may also be used to advantage for sidewalks and pavements, well or mining tubing, ceilings, and inner and outer walls of buildings, and, as it will harden under water equally as well as in the open air, it is well adapted for use for canals, dams, abutments, and piers of bridges, &c.

What I claim as my invention, and desire to secure by Letters Patent, is—

1. An artificial stone composed of cement and sand or gravel, united and solidified by dampening with a chemical solution of water, starch, soap-bark, plumbago mixed with oil, baryta or sulphate of barium, solutions of tin and copper, zinc-white or solution of zinc, asbestus, oxide of lead, (litharge,) and glycerine, substantially as and for the purpose set forth.

2. The herein-described liquid compound, consisting of water, starch, soap-bark, plumbago mixed with oil, baryta or sulphate of barium, solutions of tin and copper, zinc-white or solution of zinc, asbestus, oxide of lead, (litharge,) and glycerine, substantially in the proportions named, for the purpose of producing the crystallization of the artificial stone, as described.

Witness my hand this 29th day of January, A. D. 1879.

HENRY BACON.

In presence of—
P. E. TESCHEMACHER,
W. J. CAMBRIDGE.